UNITED STATES PATENT OFFICE 2,336,302

HEXAESTERS OF TETRAPHOSPHORIC ACID

Gerhard Schrader, Leverkusen I. G.-Werk, Germany; vested in the Alien Property Custodian No Drawing. Application August 1, 1939, Serial No. 287,760. In Germany August 3, 1938

7 Claims. (Cl. 260—461)

This invention relates to the manufacture of hexaesters of tetraphosphoric acid.

Tetraphosphoric acid esters have hitherto not been known.

The surprising discovery has been made that the hexaesters of tetraphosphoric acid can be easily prepared by causing phosphorous oxyhalogenides to react with neutral phosphoric acid esters, preferably at elevated temperature. The reaction scheme is as follows

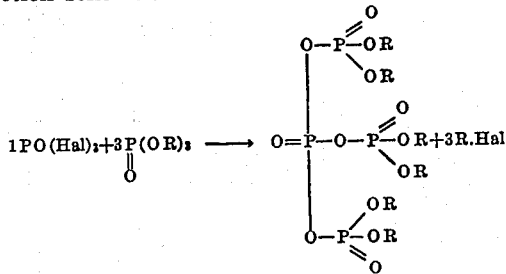

R being an organic radical, 1 carbon atom of which is directly linked to the oxygen atom.

As neutral phosphoric acid esters especially the triethyl-, tributyl- and the tri-(chloroethyl)-phosphate respectively come into consideration which are technically used as softeners. Other suitable esters are, for instance, tripropyl-trimethoxyethyl- or tricyclohexylphosphate respectively.

As phosphorous oxyhalogenides, for instance, phosphorous oxychloride or phosphorous oxybromide can be used.

For carrying out the reaction it is not necessary to use a solvent.

The reaction is suitably performed at temperatures between 130 and 150° C. and proceeds nearly quantitatively.

The products according to the invention represent water-soluble oils which have a glycerine-like consistency. They may be used, for instance, as lubricants or softeners.

The following example illustrates the invention without, however, restricting it thereto:

Example 182 gs. of triethylphosphate are heated while stirring under reflux so that the temperature of the liquid is about 150° C. Within half an hour 53 gs. (⅓ mol) of phosphorous oxychloride are added drop by drop. After the addition of phosphorous oxychloride the temperature is kept still half an hour at 150° C.; hereupon the mixture is cooled. 164 gs. of the tetraphosphoric acid hexaethylester are thus obtained. Yield: 96%.

In a similar manner the following substances may be prepared:

Tetraphosphoric-acid-hexa-n-butylester
Tetraphosphoric-acid-β-chloroethylester
Tetraphosphoric-acid-hexa-n-dodecylester
Tetraphosphoric-acid-hexa-n-propylester
Tetraphosphoric-acid-β-methoxyethylester
Tetraphosphoric-acid-cyclohexylester All the last-named substances represent oils with glycerine-like consistency.

I claim:

1. The process for the manufacture of hexaesters of tetraphosphoric acid comprising heating a phosphorous oxyhalogenide with a neutral phosphoric acid alkyl ester in a molor ratio of about 1:3 under refluxing conditions at atmospheric pressure.

2. The process for the manufacture of hexaesters of tetraphosphoric acid comprising heating a phosphorous oxyhalogenide with a neutral phosphoric acid alkyl ester in a molar ratio of about 1:3 to temperatures of about 130 to about 150° C.

3. The process for the manufacture of aliphatic hexaesters of tetraphosphoric acid by heating a prosphorous oxyhalogenide with a neutral aliphatic ester of phosphoric acid in a molar ratio of about 1:3 under refluxing conditions at atmospheric pressure.

4. The process for the manufacture of tetraphosphoric hexaethyl ester comprising heating phosphorous oxychloride with triethylphosphate in a molar ratio of about 1:3 under refluxing conditions at atmospheric pressure.

5. Hexaesters of tetraphosphoric acid of the summary formula $(RO)_6P_4O_7$, R being an aliphatic radical, 1 carbon atom of said aliphatic radical being directly linked to an oxygen atom, which products represent water-soluble oils which cannot be distilled without decomposition.

6. Hexaalkylesters of tetraphosphoric acid of the summary formula $(RO)_6P_4O_7$, R being an alkyl radical, 1 carbon atom of which is directly linked to an oxygen atom, which products represent water-soluble oils which cannot be distilled without decomposition.

7. Tetraphosphoric-acid-hexaethylester of the summary formula $(C_2H_5O)_6P_4O_7$, which product represents a water-soluble oil which cannot be distilled without decomposition.

GERHARD SCHRADER.